Nov. 29, 1955  A. B. ROSE  2,725,206
CASTING ROD HOLDER
Filed Aug. 17, 1953
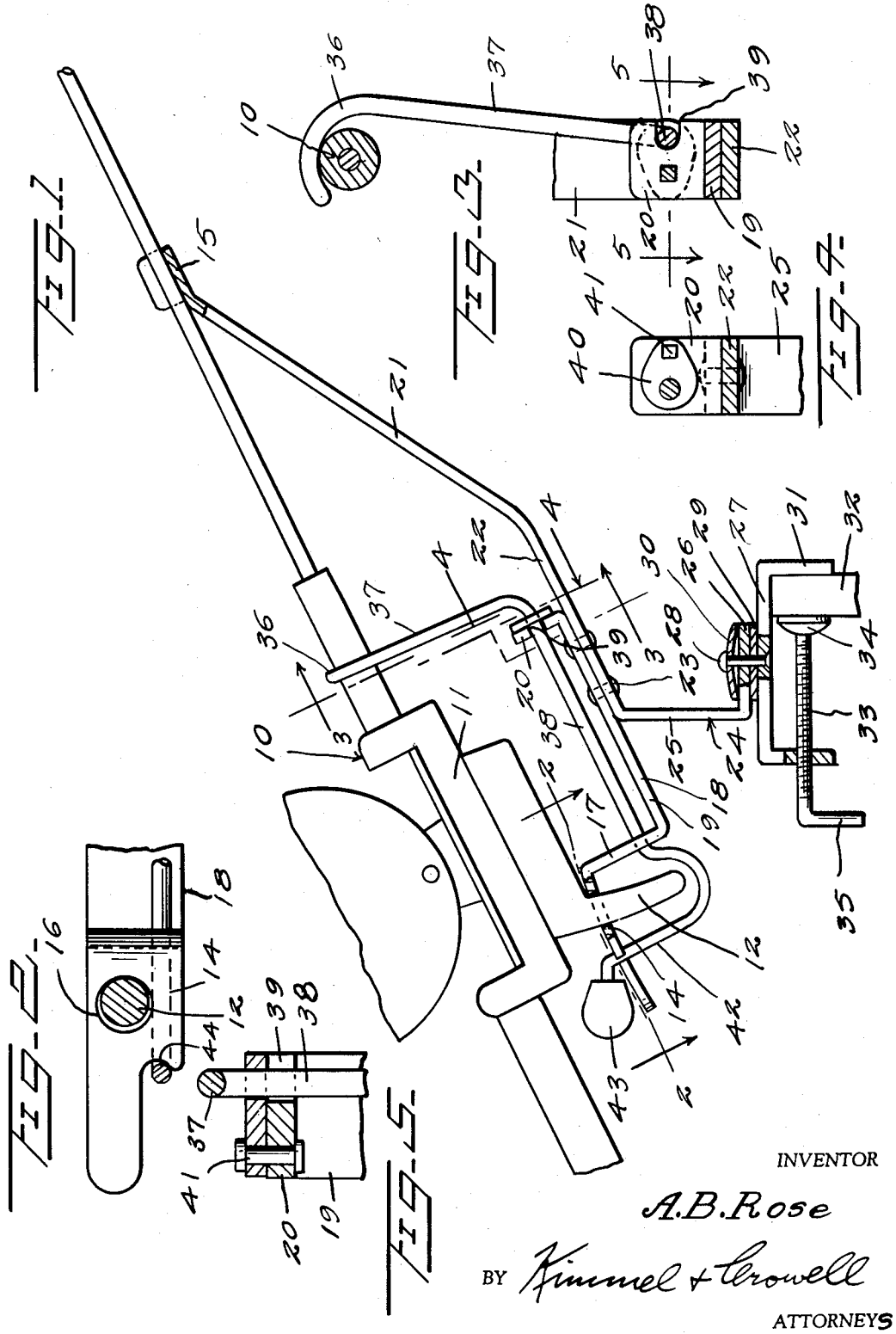
INVENTOR
*A.B.Rose*
BY *Kimmel & Crowell*
ATTORNEYS

United States Patent Office 2,725,206
Patented Nov. 29, 1955

2,725,206
CASTING ROD HOLDER

Archie B. Rose, Markel, Tex., assignor of one-half to H. S. Wills, Abilene, Tex.

Application August 17, 1953, Serial No. 374,588

1 Claim. (Cl. 248—42)

This invention relates to a fishing rod holder.

An object of this invention is to provide a fishing rod holder which is adapted to support the rod from an edge of a boat or other support, in a position whereby the rod may be quickly grasped and removed from the holder.

Another object of this invention is to provide a holder for a casting rod with a clamp pivotally secured to the holder and with friction means for holding the holder against free rotation relative to the clamp.

A further object of this invention is to provide a holder for a casting rod with an improved means for clamping the rod to the holder.

With the above and other objects in view, my invention consists in the arrangement, combination and details of construction disclosed in the drawing and specification and then more particularly pointed out in the appended claim.

In the drawing:

Figure 1 is a detailed side elevation partly broken away and in section of a fishing rod support constructed according to an embodiment of this invention.

Fig. 2 is a fragmentary sectional view taken on the line 2—2 of Figure 1.

Figure 3 is a sectional view taken on the line 3—3 of Figure 1.

Figure 4 is a fragmentary sectional view taken on the line 4—4 of Figure 1.

Figure 5 is a fragmentary sectional view taken on the line 5—5 of Figure 3.

Referring to the drawing, the numeral 10 designates generally a fishing rod which is provided with a depressed reel seat 11 and a finger engaging member 12 projecting downwardly from the seat 11.

In order to provide a means for angularly supporting the rod 10 from a support such as the side of a boat or the like, I have provided a pair of spaced supporting members 14 and 15. The supporting member 14 is provided with an opening 16 through which the finger engaging member 12 is adapted to loosely engage, and the supporting member 15 is constructed in the form of a U-shaped cradle within which the rod 10 is adapted to loosely engage.

The supporting member 14 extends rearwardly and downwardly from a rear leg 17 of a U-shaped member 18. The U-shaped member 18 includes a bight 19 and a relatively short forward leg 20. The cradle 15 is carried by a downwardly and rearwardly inclined arm 21 which extends from an obtusely disposed bar 22 fixed as by fastening members 23 at the lower side of the bight 19.

An L-shaped member 24 extends downwardly from the bar 22 and includes a substantially vertically disposed long side 25 and a substantially horizontally disposed short side 26. An inverted U-shaped clamp member 27 is secured by fastening means 28 to the short side 26 and preferably a friction washer 29 is interposed between the short side 26 and the bight of the U-shaped member 27.

A dished resilient washer 30 is interposed between the upper side of the short side 26 and the head of the fastening member 28 so that the L-shaped member 24 will be resiliently and frictionally held against rotation relative to the U-shaped clamping member 27. The clamping member 27 includes a jaw 31 adapted to engage on one side of a support 32 and also includes a threaded shaft 33 which has mounted on the inner end thereof, an adjustable clamping jaw 34.

The outer end of the shaft 33 is formed with a handle 35.

In order to provide a means whereby the fishing rod 10 will be firmly held on the supporting members 14 and 15, I have provided a hook shaped clamping member 36 which includes an elongated downwardly inclined shank 37. The shank 37 extends obtusely upwardly and forwardly from a shaft 38 which is rotatably disposed in the legs 17 and 20 of the U-shaped member 18.

As shown in Figures 3 and 4, the short leg 20 is formed with a slot 39 extending inwardly from one side thereof and within which the forward end of the shaft 38 is adapted to loosely engage.

A washer or fastening member 40 engages about the shaft 38 on the outer or upper side of the leg 20 and is formed with a lug 41 which extends through, and is secured relatively to the leg 20. The rear end of the shaft 38 has formed integral therewith, a lever 42 which is provided with a knob 43 at its upper rear end.

The lever 42 is adapted to engage in a keeper notch 44 which is formed in the rear portion of the supporting member 14.

In the use and operation of this device, the handle of the fishing rod 10 has the lug or finger member 12 extended through the opening 16 of the supporting member 14 and the rod forwardly of the handle is adapted to rest in the cradle or U-shaped member 15.

Lever 42 is swung upwardly, thereby swinging clamping member 36 upwardly and over the forward end of the fishing rod handle, as shown in Figures 1 and 3.

At this time the upper end of lever 42 will snap into keeper notch 44 so that the handle of the fishing rod will be resiliently clamped to the supporting member 14, and the rod forwardly of the handle will be clamped in the cradle 15.

When it is desired to quickly remove the rod from the supporting device, lever 42 is swung outwardly or to the right, as viewed in Figure 2, thereby swinging locking member 36 to the right and to a disengaged position with respect to the rod 10.

The fishing rod support hereinbefore described will provide a means whereby a casting or other type of rod may be firmly secured to a side or end of a boat so that the rod can be used for trolling purposes.

What is claimed is:

A fishing rod holder comprising a U-shaped member having a relatively long bight, a short forward leg and a relatively long rear leg, a rearwardly projecting keeper arm carried by said rear leg, a bar fixed to said bight and projecting forwardly of said forward leg, an obtusely inclined arm extending from the forward end of said bar, a cradle carried by the upper end of said inclined arm, an L-shaped supporting bar extending downwardly from said first named bar, said supporting bar having a horizontal lower side, an inverted U-shaped clamp pivotally carried by said lower side of said L-shaped member, said keeper arm supporting said rod and having an opening for receiving the finger piece of a fishing rod, a shaft journalled through the legs of said first named U-shaped member, an upwardly extending hook-shaped rod clamping member carried by the forward end of said shaft, a resilient upwardly extending lever carried by the rear end of said shaft, and a keeper formed on said keeper arm for latching said lever in rod clamping position.

References Cited in the file of this patent

UNITED STATES PATENTS

| | | |
|---|---|---|
| 2,530,265 | Phalen | Nov. 14, 1950 |
| 2,553,231 | Bayto | May 15, 1951 |
| 2,576,212 | Carter | Nov. 27, 1951 |
| 2,599,160 | Brauer | June 5, 1952 |
| 2,606,731 | Harris | Aug. 12, 1952 |